United States Patent
Li

(10) Patent No.: US 10,129,459 B2
(45) Date of Patent: Nov. 13, 2018

(54) ELECTRONIC DEVICE AND IMAGE CAPTURING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Feng Li, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 305 days.

(21) Appl. No.: 15/050,811

(22) Filed: Feb. 23, 2016

(65) Prior Publication Data

US 2017/0180636 A1    Jun. 22, 2017

(30) Foreign Application Priority Data

Dec. 18, 2015   (CN) .......................... 2015 1 0955584

(51) Int. Cl.
| | |
|---|---|
| H04N 7/18 | (2006.01) |
| H04N 5/232 | (2006.01) |
| G06K 9/00 | (2006.01) |
| H04N 1/00 | (2006.01) |
| G06K 9/62 | (2006.01) |

(52) U.S. Cl.
CPC ....... *H04N 5/23219* (2013.01); *G06K 9/0063* (2013.01); *G06K 9/00248* (2013.01); *H04N 1/00* (2013.01); *H04N 5/23203* (2013.01); *H04N 7/183* (2013.01); *G06K 9/6202* (2013.01)

(58) Field of Classification Search
CPC .. H04N 5/23203; H04N 5/23219; H04N 1/00; H04N 7/183; G06K 9/0063; G06K 9/00248; G06K 9/6202
USPC .......................................... 348/144
See application file for complete search history.

(56) References Cited

U.S. PATENT DOCUMENTS

| | | | | |
|---|---|---|---|---|
| 2010/0008548 | A1* | 1/2010 | Matsuoka | G06K 9/00228 382/118 |
| 2011/0028093 | A1* | 2/2011 | Patel | H04B 17/27 455/41.2 |
| 2012/0236112 | A1* | 9/2012 | Cilia | B60R 11/04 348/36 |
| 2014/0163781 | A1* | 6/2014 | Vian | A01G 23/00 701/3 |

* cited by examiner

*Primary Examiner* — Allen C Wong
(74) *Attorney, Agent, or Firm* — ScienBiziP, P.C.

(57) ABSTRACT

An image capturing method includes detecting a predetermined target, the predetermined target includes an object that is positioned on a user. A camera device is controlled to capture an image or a video, when the predetermined target is detected.

20 Claims, 4 Drawing Sheets

ELECTRONIC DEVICE AND IMAGE CAPTURING METHOD

CROSS-REFERENCE TO RELATED APPLICATIONS

This application claims priority to Chinese Patent Application No. 201510955584.2 filed on Dec. 18, 2015, the contents of which are incorporated by reference herein.

FIELD

The subject matter herein generally relates to image capturing technology, and particularly to an electronic device and a method for capturing an image using the electronic device.

BACKGROUND

An electronic device such as a mobile phone can be used to capture images. However, when a user uses the electronic device to capture an image, the user should hold the electronic device, it is not convenient.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
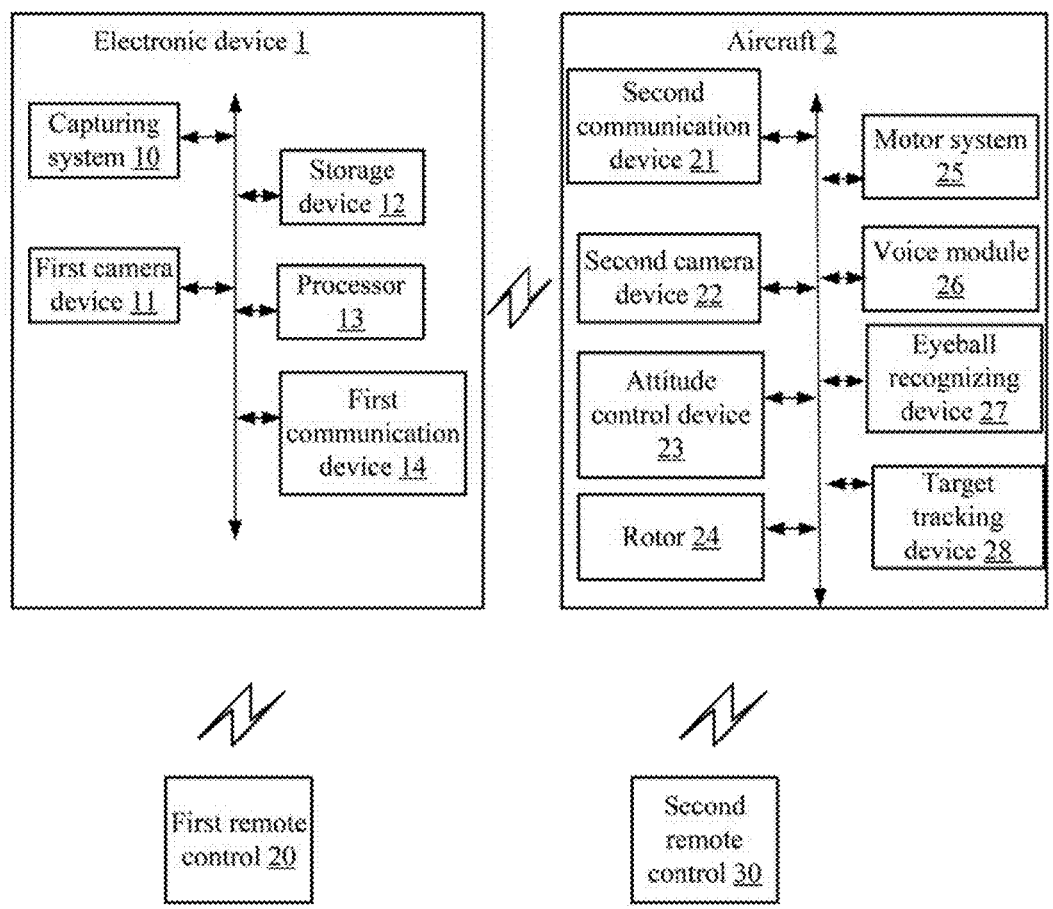
FIG. 1 is a block diagram of one embodiment of an electronic device and an aircraft.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 2:
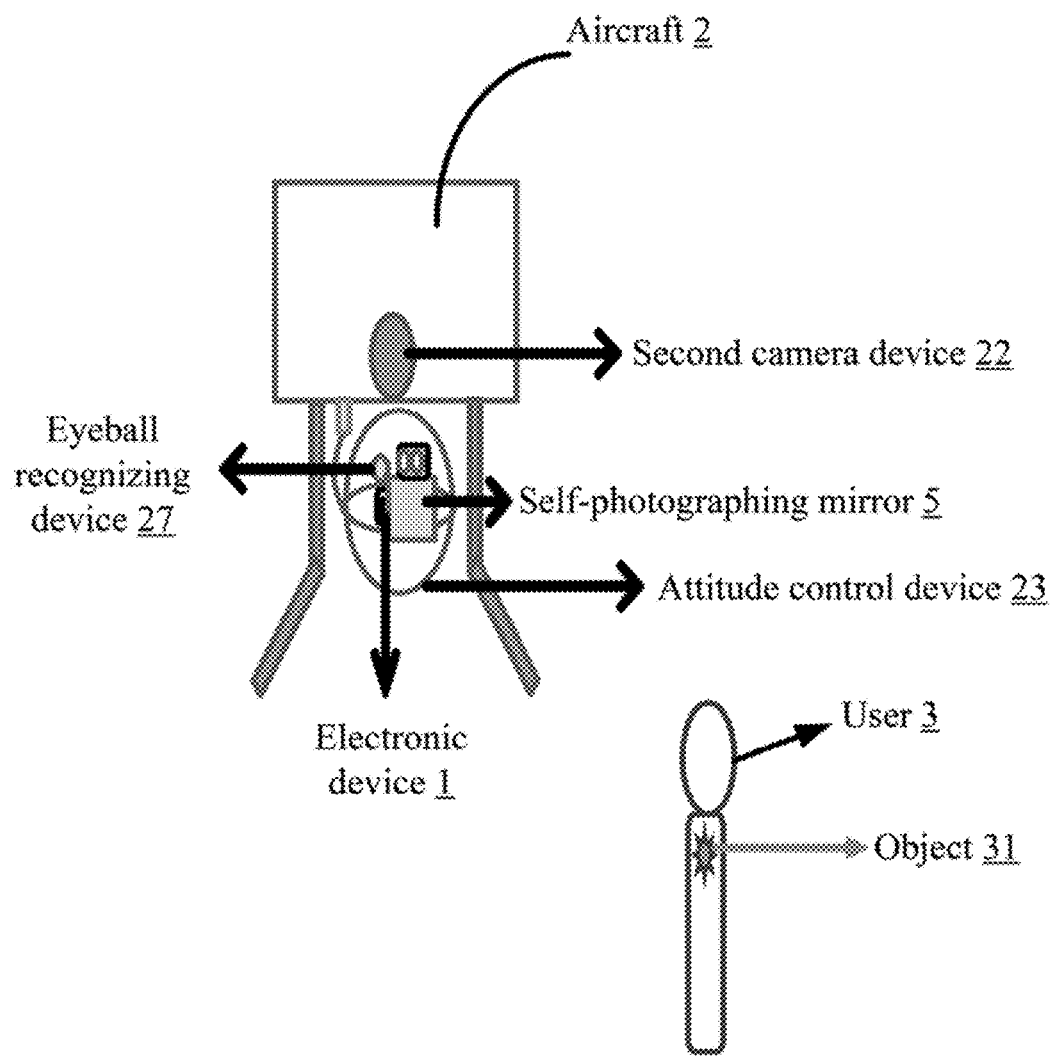
FIG. 2 illustrates an example of a position of the electronic device installed on the aircraft.

FIG. 1 is a block diagram of one embodiment of an electronic device and an aircraft. FIG. 2 illustrates an example of a position of the electronic device installed on the aircraft. Depending on the embodiment, an electronic device 1 includes a capturing system 10, a first camera device 11, a storage device 12, at least one processor 13, and a first communication device 14. An aircraft 2 includes a second communication device 21, a second camera device 22, an attitude control device 23, at least four rotors 24, a motor system 25, and a voice module 26.

The aircraft 2 can further internally or externally connect an eyeball recognizing device 27 and a target tracking device 28. The electronic device 1 can be externally connected to a self-photographing mirror 5, which can be used to preview an image for a user 3 when the user 3 captures images of himself.

The electronic device 1 can be a smart phone, a personal digital assistant (PDA), a tablet computer, or any other suitable electronic device. FIG. 1 illustrates only one example of the electronic device 1 and the aircraft 2 that can include more or fewer components than illustrated, or have a different configuration of the various components in other embodiments. For example, the electronic device 1 and the aircraft 2 may further include lighting devices.

In at least one embodiment, the electronic device 1 can communicate with the aircraft 2 using the first communication device 14 and the second communication device 21. The first communication device 14 and the second communication device 21 can provide a function of network communication and data transmission for the electronic device 1 and the aircraft 2, based on a wired or wireless network transmission method. The wired or wireless network transmission method may include, but are not limited to, a traditional network connection, general packet radio service (GPRS), WIFI.

A first remote control 20 can be in electronic connection with the electronic device 1. The first remote control 20 can be used to control the first camera device 11 to capture images. A second remote control 30 can be in electronic connection with the aircraft 2. The second remote control 30 can be used to adjust an angle of the attitude control device 23, and adjust a height of the attitude control device 23 that is relative to a ground. In at least one embodiment, the attitude control device 23 can be a three-dimensional attitude control device.

In at least one embodiment, the first remote control 20 and the second remote control 30 can be coupled with a wired or wireless connection to communicate with the electronic device 1 and the aircraft 2 respectively. For example, the first remote control 20 and the second remote control 30 can communicate with the electronic device 1 and the aircraft 2 via Bluetooth respectively. In at least one embodiment, each of the first remote control 20 and the second remote control 30 has a size about the size of a dollar coin.

In at least one embodiment, the electronic device 1 can be positioned on the aircraft 2. For example, the electronic device 1 can be positioned on the attitude control device 23 of the aircraft 2. Thereby, when the user 3 adjusts the angle of the attitude control device 23 using the second remote control 30, a capturing angle of the first camera device 11 of the electronic device 1 is adjusted accordingly.

In at least one embodiment, the attitude control device 23 can be installed with a software program of a motion sensing technology, which enables the user 3 can control the angle of the attitude control device 23 using hand gestures, and enables the user 3 can control the height of the attitude control device 23 that is relative to the ground using hand gestures. When the software program is run in the attitude control device 23, the attitude control device 23 can obtain images of the user 3 captured by the first camera device 11 or the second camera device 22 by executing the software program. The attitude control device 23 can recognize hand gestures of the user 3 in the obtained images using an image recognition technology by executing the software program. By executing the software program, the angle of the attitude control device 23 and the height of the attitude control device 23 that is relative to the ground can be adjusted according to the hand gestures of the user 3.

The first camera device 11 can be a front camera device or a rear camera device of the electronic device 1. In at least one embodiment, the first camera device 11 is the rear camera device.

The second camera device 22 can be a panoramic camera device. The voice module 26 can be used to output audio information. In at least one embodiment, the voice module 26 can be a speaker.

The motor system 25 can be used to control a rotate speed of each of the at least four rotors 24.

The capturing system 10 can be used to control the first camera device 11 to capture an image or a video when a predetermined target on the user 2 is detected. The capturing system 10 can also be used to control the first camera device 11 to capture the image or the video when a control signal is received from the first remote control 20.

In at least one embodiment, the predetermined target is eyeballs of the user 3, when the eyeball recognizing device 27 recognizes the eyeballs of the user 3, or the capturing system 10 recognizes the eyeballs of the user 3 using an image recognizing technology, the capturing system 10 determines that the predetermined target on the user 2 is detected. Detail will be provided in the following paragraphs.

In other embodiments, the predetermined target can be an object 31, which can be positioned on the user 3. For example, the object 31 can be a label, or a coin that can be recognized by a normal user according to a color of the object 31 or other feature such as a shape of the object 31. The object 31 can be worn on the user 3, or can be pasted on the user 3. The position of the object 31 on the user 3 can be determined by the user 3 according to a requirement of capturing the image or the video.

In at least one embodiment, when the capturing system 10 detects the object 31 via the image recognizing technology, the capturing system 10 determines that the predetermined target is detected.

In another embodiment, the object 31 can be an element, which can emit ultrasound wave of a specified frequency. When the target tracking device 28 detects a position of the object 31 according to the ultrasound wave of the specified frequency, the capturing system 10 determines that the predetermined target is detected.

In other embodiments, the object 31 is configured with a function of Bluetooth communication. The capturing system 10 can detect the position of the object 31 using a Bluetooth target capture technology.

In at least one embodiment, each of the eyeball recognizing device 27 and the target tracking device 28 can be positioned on the attitude control device 23. In at least one embodiment, each of the eyeball recognizing device 27 and the target tracking device 28 is positioned on a position that is next to the electronic device 1, when the electronic device 1 is positioned on the attitude control device 23. Thereby, when the eyeball recognizing device 27 detects the eyeballs of the user 3 or the target tracking device 28 detects the object 31, the electronic device 1 is substantially face to the user 3.

Figure 3:
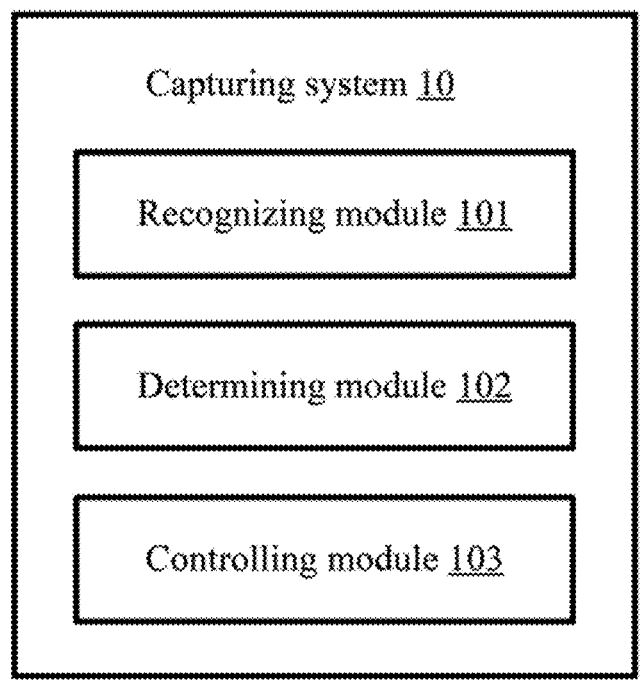
FIG. 3 is a block diagram of one embodiment of modules of a capturing system.

FIG. 3 is a block diagram of one embodiment of modules of the capturing system 10. In at least one embodiment, the capturing system 10 can include a recognizing module 101, a determining module 102, and a controlling module 103. The modules 101-103 can include computerized codes in the form of one or more programs, which are stored in the storage device 12, and are executed by the at least one processor 13 of the electronic device 1.

Figure 4:
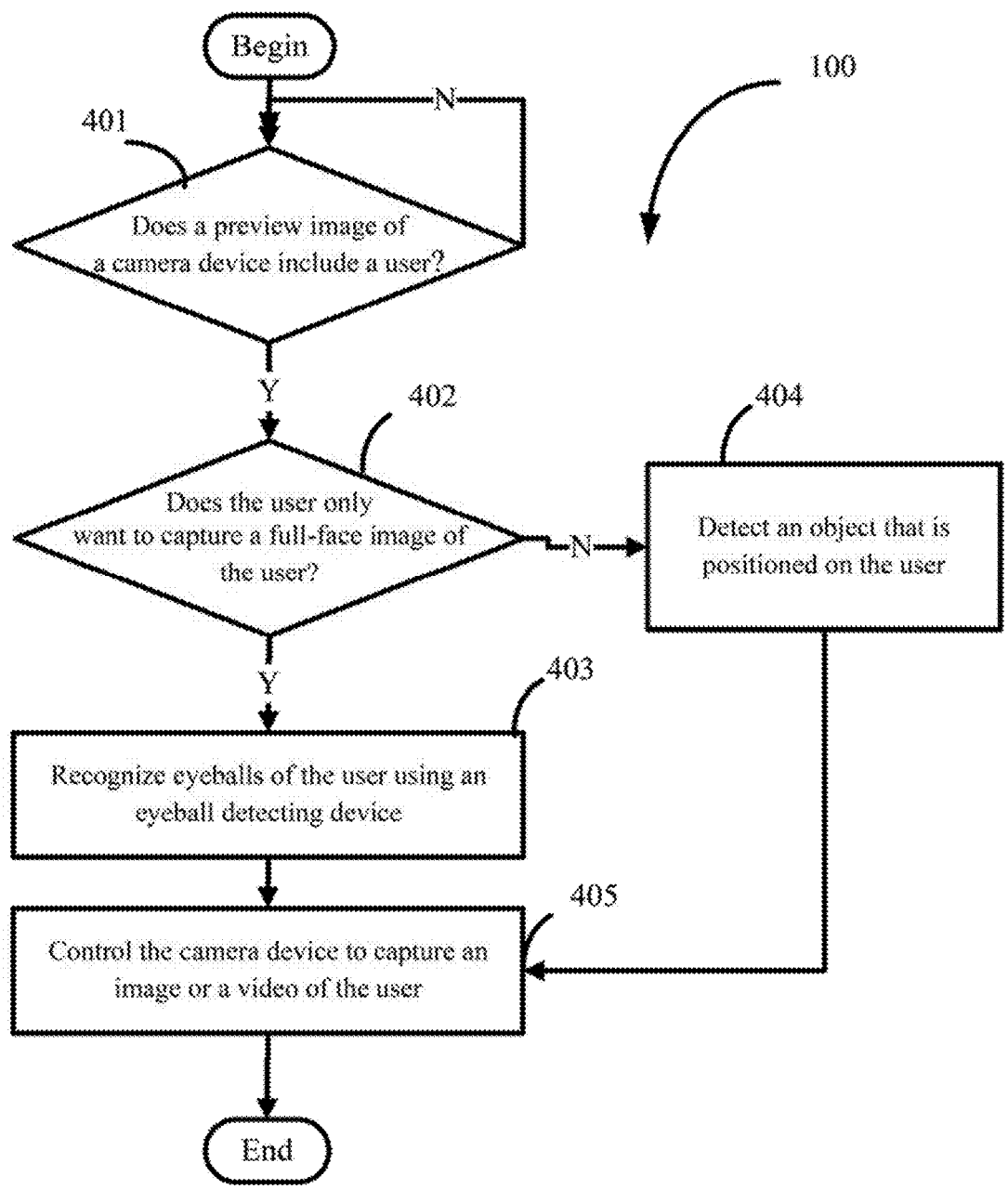
FIG. 4 illustrates a flowchart of one embodiment of a method for capturing an image using the electronic device of FIG. 1.

FIG. 4 illustrates a flowchart which is presented in accordance with an example embodiment. The example method 100 is provided by way of example, as there are a variety of ways to carry out the method. The method 100 described below can be carried out using the configurations illustrated in FIG. 1 and FIG. 2, for example, and various elements of these figures are referenced in explaining example method 100. Each block shown in FIG. 4 represents one or more processes, methods, or subroutines, carried out in the example method 100. Additionally, the illustrated order of blocks is by example only and the order of the blocks can be changed according to the present disclosure. The example method 100 can begin at block 401. Depending on the embodiment, additional steps can be added, others removed, and the ordering of the steps can be changed.

At block 401, the recognizing module 101 can determine whether a preview image of the second camera device 22 includes the user 3. When the preview image of the second camera device 22 includes the user 3, the process goes to block 402. When the preview image of the second camera device 22 does not include the user 3, the recognizing module 101 can continue to determine whether the preview image of the second camera device 22 includes the user 3.

In at least one embodiment, the recognizing module 101 can firstly obtain the preview image of the second camera device 22, then determine whether the preview image of the second camera device 22 includes the user 3 using a template matching algorithm.

In at least one embodiment, the recognizing module 101 can pre-store one or more image templates of human shape in the storage device 12. The recognizing module 101 can compare the preview image of the second camera device 22 with the one or more image templates. When the preview image of the second camera device 22 includes a human shape that matches one of the image templates. The recognizing module 101 can determine the preview image of the second camera device 22 includes the user 3.

In other embodiments, the block 401 can be replaced with the recognizing module 101 determines whether a preview image of the first camera device 11 includes the user 3. When the preview image of the first camera device 11 includes the user 3, the process goes to block 402. When the preview image of the first camera device 11 does not include the user 3, the recognizing module 101 continues to determine whether the preview image of the first camera device 11 includes the user 3.

Similarly, the recognizing module 101 can determine whether the preview image of the first camera device 11 includes the user 3, by comparing the preview image of the first camera device 11 with the one or more image templates.

At block 402, the determining module 102 can determine whether the user 3 only wants to capture a full-face image of the user 3. If the user 3 only wants to capture the full-face image, the process goes to block 403. If the user 3 not only wants to capture the full-face image, the process goes to block 404.

In at least one embodiment, when the eyeball recognizing device 27 is activated, the determining module 102 determines the user 3 only wants to capture the full-face image. When the eyeball recognizing device 27 is inactivated, the determining module 102 determines the user 3 not only wants to capture the full-face image.

At block 403, the recognizing module 101 can recognize the eyeballs of the user 3 using the eyeball recognizing device 27. When the eyeballs of the user 3 is detected, the process goes to block 405.

In at least one embodiment, the recognizing module 101 can recognize the eyeballs of the user 3 from the preview image of the first camera device 11 using the image recognizing technology.

At block 404, the recognizing module 101 can detect the object 31 that is positioned on the user 3. When the object 31 is detected, the process goes to block 405.

In at least one embodiment, the object 31 is a label, the recognizing module 101 can determine whether the preview image of the first camera device 11 includes the label using the image recognizing technology. When the preview image of the first camera device 11 includes the label, the recognizing module 101 can determine the object 31 is detected. In at least one embodiment, the recognizing module 101 recognizes the label by recognizing the color of the label and/or the shape of the label, using the image recognizing technology.

In another embodiment, when the object 31 can emit ultrasound wave of the specified frequency, and the target tracking device 28 detects the position of the object 31 according to the ultrasound wave of the specified frequency, the recognizing module 101 can determine the object 31 is detected.

In other embodiments, when the object 31 has a function of Bluetooth communication. The recognizing module 101 can detect the object 31 using the Bluetooth target capture technology.

In other embodiments, the recognizing module 101 can calculate a distance value between the electronic device 1 and the object 31 using the ultrasound wave of the specified frequency or the Bluetooth target capture technology. When the distance value is not within in a predetermined distance range, the recognizing module 101 can control motor system 25 to adjust the rotation speed of each of the at least four rotors 24, to ensure the distance between the aircraft 2 and the user 3 is within the predetermined distance range.

In at least one embodiment, when the distance value is greater than a greatest distance value of the predetermined distance range, the recognizing module 101 can control motor system 25 to increase the rotation speed of each of the at least four rotors 24. When the distance value is less than a smallest distance value of the predetermined distance range, the recognizing module 101 can control motor system 25 to decrease the rotation speed of each of the at least four rotor 24.

In at least one embodiment, when the distance value is not within in the predetermined distance range, the recognizing module 101 can further control the voice module 24 of the aircraft 2 or a speaker (not indicated) of the electronic device 1 to transmit a voice prompt, to prompt the user that the distance value is not within in the predetermined distance range.

Because the user 3 can conveniently change the position of the object 31 on the user 3, in at least one embodiment, when the object 31 is detected, the recognizing module 101 can further recognize change of the position of the object 31 according to preview images of the first camera device 11 at different time. The recognizing module 101 can further adjust the capturing angle of the first camera device 11 by adjusting the angle of the attitude control device 23, and/or adjusting the height of the attitude control device 23 that is relative to the ground, according to the change of the position of the object 31.

For example, the recognizing module 101 recognizes a first position of the object 31 is on a left hand of the user 3 in a first preview image of the first camera device 11 at a first time (e.g., T1). The recognizing module 101 recognizes a second position of the object 31 is on a right hand of the user 3 in a second preview image of the first camera device 11 at a second time (e.g., T1+5 s). Then the recognizing module 101 determines the position of the object 31 is changed from left to right. The recognizing module 101 can control the attitude control device 23 to move from right to left, to ensure the capturing angle of the first camera device 11 can be adjusted according to the change of the position of the object 31.

At block 405, the controlling module 103 can control the first camera device 11 of the electronic device 1 to capture an image or a video.

In at least one embodiment, when the eyeball recognizing device 27 detects the eyeballs of the user 3, or the target tracking device 28 detects the object 31, the controlling module 103 can transmit a voice message to prompt the user 3 that the predetermined target is detected. When no further operation of the user 3 is detected in a predetermined time period, the controlling module 103 can control the first camera device 11 to capture the image or the video.

In at least one embodiment, the further operation includes the user 3 uses the second remote control 30 to adjust the angle of the attitude control device 23, and/or adjust the height of the attitude control device 23 that is relative to the ground. In other words, when the attitude control device 23 does not receive control signals from the second remote control 30 in the predetermined time period, the controlling module 103 determines that no further operation of the user 3 is detected. Then the controlling module 103 controls the first camera device 11 to capture the image or the video.

In other embodiments, the controlling module 103 can also control the first camera device to capture the image or the video, when a control signal is received from the first remote control 20.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An image capturing method using an electronic device installed on an aircraft, the electronic device comprising a camera device, the method comprising:
    detecting a predetermined target comprising an object that is positioned on a user;
    calculating a distance value between the electronic device and the predetermined target when the predetermined target is detected;
    determining whether the distance value is within a predetermined distance range; and
    controlling, when the distance value is not within the predetermined distance range, a motor system of the aircraft to adjust a rotate speed of each of rotors of the aircraft, to ensure the distance value is within the predetermined distance range; and
    controlling the camera device to capture an image or a video of the predetermined target.

2. The method according to claim 1, wherein before detecting the predetermined target, the method further comprises:
    determining whether a preview image of a camera device of the aircraft or a preview image of the camera device of the electronic device includes the user.

3. The method according to claim 2, further comprising:
    obtaining the preview image of the camera device of the aircraft; and
    determining the preview image of the camera device of the aircraft includes the user using a template matching algorithm;
    obtaining the preview image of the camera device of the electronic device; and
    determining the preview image of the camera device of the electronic device includes the user using the template matching algorithm.

4. The method according to claim 1, wherein the object is detected according to a color of the object, and/or a shape of the object using an image recognizing technology.

5. The method according to claim 1, wherein the object emits ultrasound wave of a specified frequency, the object is determined to be detected when a target tracking device detects the ultrasound wave of the specified frequency.

6. The method according to claim 5, wherein the object has a function of Bluetooth communication, the object is detected using a Bluetooth target capture technology.

7. The method according to claim 1, further comprising:
    controlling the motor system to increase the rotation speed of each rotor of the aircraft when the distance value is greater than a maximum distance value of the predetermined distance range; and
    controlling the motor system to decrease the rotation speed of each rotor of the aircraft when the distance value is less than a minimum distance value of the predetermined distance range.

8. The method according to claim 1, wherein the predetermined target further comprises eyeballs of the user, the eyeballs of the user are detected using an eyeball recognizing device.

9. The method according to claim 8, wherein the electronic device is positioned on an attitude control device of the aircraft, the eyeball recognizing device is positioned on the attitude control device, and is next to the electronic device.

10. The method according to claim 9, further comprising:
    recognizing change of a position of the object according to preview images of the camera device of the electronic device at different time; and
    adjusting a capturing angle of the camera device of the electronic device, by adjusting an angle of the attitude control device, and/or adjusting a height of the attitude control device that is relative to a ground, according to the change of the position of the object.

11. An electronic device installed on an aircraft, comprising:
    a camera device;
    at least one processor; and
    a non-transitory computer-readable medium configured to store one or more programs that, when executed by the at least one processor, cause the at least one processor to:
    detect a predetermined target comprising an object that is positioned on a user;
    calculate a distance value between the electronic device and the predetermined target when the predetermined target is detected;
    determine whether the distance value is within a predetermined distance range; and
    control, when the distance value is not within the predetermined distance range, a motor system of the aircraft to adjust a rotate speed of each of rotors of the aircraft, to ensure the distance value is within the predetermined distance range; and
    control the camera device to capture an image or a video of the predetermined target.

12. The electronic device according to claim 11, wherein before detecting the predetermined target, the at least one processor further caused to:
    determine whether a preview image of a camera device of an aircraft or a preview image of the camera device of the electronic device includes the user.

13. The electronic device according to claim 12, wherein the at least one processor further caused to:
    obtain the preview image of the camera device of the aircraft; and determine the preview image of the camera device of the aircraft includes the user using a template matching algorithm; and
    obtain the preview image of the camera device of the electronic device; and
    determine the preview image of the camera device of the electronic device includes the user using the template matching algorithm.

14. The electronic device according to claim 11, wherein the object is detected according to a color of the object, and/or a shape of the object using an image recognizing technology.

15. The electronic device according to claim 11, wherein the object emits ultrasound wave of a specified frequency, the object is determined to be detected when a target tracking device detects the ultrasound wave of the specified frequency.

16. The electronic device according to claim 15, wherein the object has a function of Bluetooth communication, the object is detected using a Bluetooth target capture technology.

17. The electronic device according to claim 16, wherein the at least one processor further caused to:
    control the motor system to increase the rotation speed of each rotor of the aircraft when the distance value is greater than a maximum distance value of the predetermined distance range; and control the motor system to decrease the rotation speed of each rotor of the aircraft when the distance value is less than a minimum distance value of the predetermined distance range.

18. The electronic device according to claim 11, wherein the predetermined target further comprises eyeballs of the user, the eyeballs of the user are detected using an eyeball recognizing device.

19. The electronic device according to claim 18, wherein the electronic device is positioned on an attitude control device of the aircraft, the eyeball recognizing device is positioned on the attitude control device, and is next to the electronic device.

20. The electronic device according to claim 19, wherein the at least one processor further caused to:
  recognize change of a position of the object according to preview images of the camera device of the electronic device at different time; and
  adjust a capturing angle of the camera device of the electronic device, by adjusting an angle of the attitude control device, and/or adjusting a height of the attitude control device that is relative to a ground, according to the change of the position of the object.

* * * * *